United States Patent [19]

Rogers

[11] 4,443,516
[45] Apr. 17, 1984

[54] WARP KNIT SIGN FABRIC

[75] Inventor: Jack S. Rogers, Spartanburg, S.C.

[73] Assignee: Milliken Research Corporation, Spartanburg, S.C.

[21] Appl. No.: 508,020

[22] Filed: Jun. 27, 1983

[51] Int. Cl.³ .............................................. B32B 7/00
[52] U.S. Cl. .................................. 428/253; 428/254; 428/257
[58] Field of Search .............. 428/253, 254, 257, 265, 428/260; 66/195

[56] References Cited

U.S. PATENT DOCUMENTS

| | | |
|---|---|---|
| 1,407,012 | 2/1922 | Branson . |
| 2,012,355 | 8/1935 | Schonfeld ............................. 66/84 |
| 2,149,031 | 2/1939 | Schonfeld ............................. 66/84 |
| 2,149,032 | 2/1939 | Schonfeld ............................. 66/84 |
| 3,077,758 | 2/1963 | Siciliano ............................. 66/192 |
| 3,222,893 | 12/1966 | Busch et al. ........................ 66/192 |
| 4,044,575 | 8/1977 | Krug ................................... 66/192 |
| 4,067,209 | 1/1978 | Hucera et al. ..................... 428/254 |
| 4,067,210 | 1/1978 | Arons et al. ........................ 66/202 |
| 4,349,593 | 9/1982 | Blechstein ......................... 428/254 |
| 4,350,725 | 9/1982 | Pflüger .............................. 428/254 |
| 4,388,364 | 6/1983 | Sanders ............................. 428/254 |

Primary Examiner—James J. Bell
Attorney, Agent, or Firm—Earle R. Marden; H. William Petry

[57] ABSTRACT

A warp knit, weft inserted fabric for use as a substrate between sheets of PVC film laminated thereto and used in outdoor signs. The fabric is a two bar fabric with the front bar having a movement of 1-0/0-1/1-2/2-1 and the back bar having a movement of 1-1/1-1/0-0/0-0.

6 Claims, 3 Drawing Figures

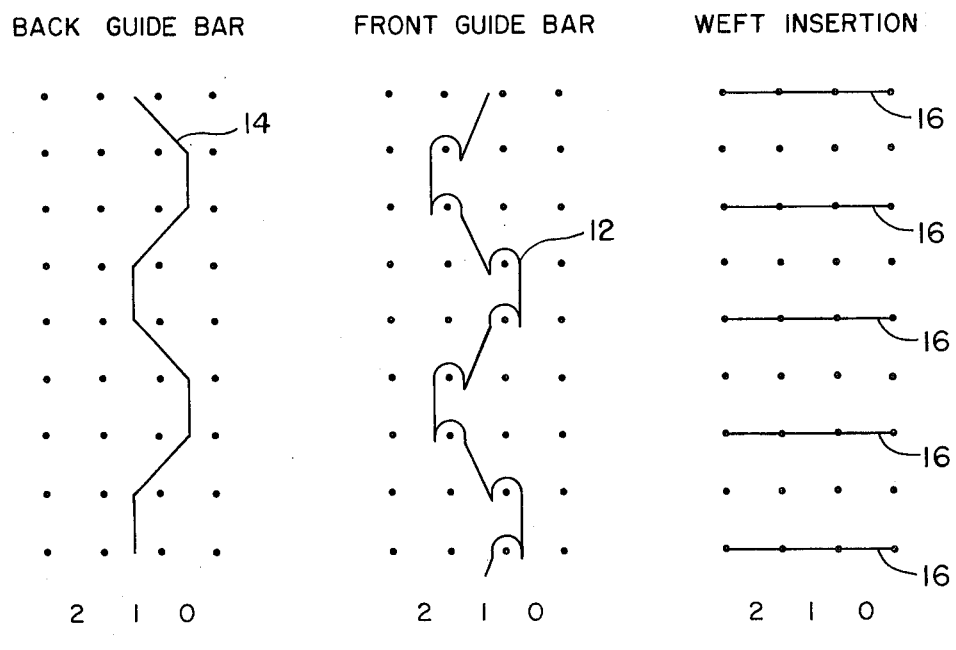
FIG.-1-
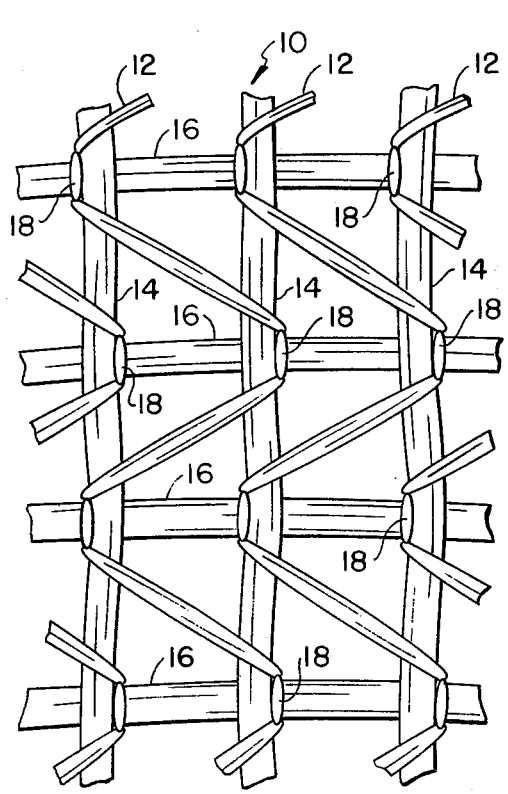
FIG.-2-
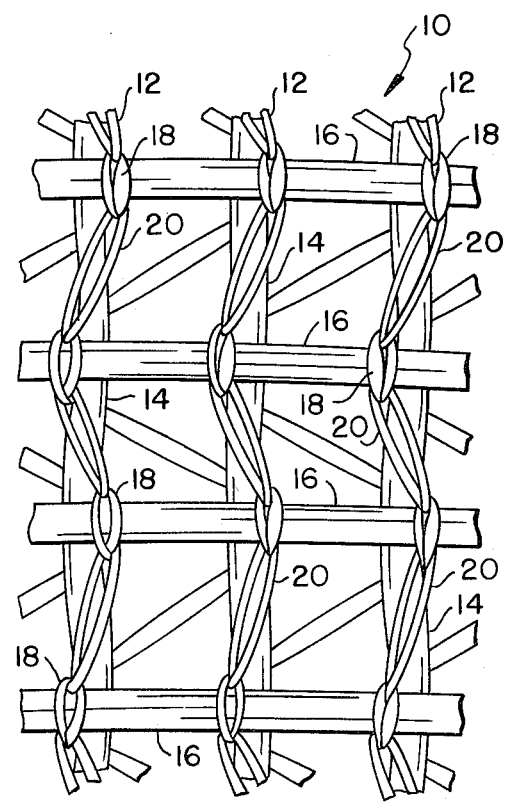
FIG.-3-

WARP KNIT SIGN FABRIC

This invention relates generally to fabrics used in the construction of large outdoor signs and in particular to a novel substrate fabric to be coated or laminated for use in the manufacture of outdoor signs.

In recent years the manufacturers of large outdoor signs have tried substitute materials for the signs since the plastic like material used in sign construction is expensive, brittle and tends to get broken either by weather conditions or vandalism. To solve this problem the sign manufacturers have explored the use of textile substrate materials with a film laminated on one side or both sides as a substitute for the previously used signs.

Therefore, it is an object of the invention to provide a substrate for a coated product to be used in sign manufacture which is economical to produce and is stable when being laminated and when used in the final sign product.

Other objects and advantages of the invention will become readily apparent as the specification proceeds to describe the invention with reference to the accompanying drawing, in which:

FIG. 1 is a point diagram for the improved warp knit, weft inserted substrate fabric;

FIG. 2 is a view of the face side of the wrap knit fabric; and

FIG. 3 is a view of the back side of the warp knit fabric.

Looking now to FIGS. 2 and 3, respectively, the face and back sides of the new and improved fabric substrate 20 are shown. The substrate is, preferably, knit from all polyester yarns and consists of a front bar yarn 12, a back bar yarn 14 and a weft inserted yarn 16. The substrate 10 is knit on a conventional warp knit, weft insertion knitting machine employing two bars and a weft insertion mechanism to lay in the weft or fill yarns 16.

The substrate 10 shown in FIGS. 2 and 3 is an open fabric construction knit nine to 12 ends per inch with the weft yarn 16 laid in on every other course. The bar movements for the front and back bar are indicated in FIG. 1 with the front bar movement being 1-0/0-1/1-2/2-1 and the back bar movement being 1-1/1-1/0-0/0-0. As indicated the weft yarn 16 is inserted into every other course.

In the preferred embodiment of the invention, the front bar yarn is 70 denier, 34 filament DuPont type 56 polyester yarn. The back bar yarn and the weft inserted yarns are 1000 denier, 192 filament Celanese Type 787 polyester yarns. After the substrate 10 has been knit with the particular bar movement and the preferred yarns, it can be laminated on both sides with a PVC film to form a stable fabric which can be used for a substitute for rigid structures such as plastic used to manufacture outdoor signs. This is accomplished because the particular bar movement allows the fill yarns 16 to be inserted in those courses where the tight loop 18 is formed. These tight loops or stitches around the filling yarn 16 create an extremely stable structure since the filling yarn stabilizes the fabric in the course direction and the back bar yarns 12 stabilizes the fabric in the wale direction.

The stability of the substrate 10 is accomplished by feeding the front bar yarns at a fixed rate of yarn delivery during the knitting cycle to a structure which normally requires constant yarn tension to form loops of consistent length. This results in the stitch construction shown in FIGS. 2 and 3 wherein obtained tight loops 18 and long loops 20.

As discussed above the disclosed substrate fabric when laminated with a suitable film material such as PVC provides a fairly rigid, stable fabric which can be used in place of rigid materials such as plastics in outdoor signs.

Although I have described in detail the specific embodiments of the invention, it is contemplate that changes may be made without departing from the scope or spirit of the invention, and I desire to be limited only by the claims.

I claim:

1. A fabric for use as the structural material for outdoor signs comprising: a warp knit, weft inserted substrate material and a sheet of PVC film material laminated to both sides of said substrate, said substrate being a two-bar fabric with a fill yarn inserted in every other course of said fabric, said two-bar fabric having a design represented by a front bar movement of 1-0/0-1/1-2/2-1 and a back bar movement of 1-1/1-1/0-0/0-0.

2. The fabric of claim 1 wherein the front bar yarns and the back bar yarns are polyester.

3. The fabric of claim 2 wherein the fill yarn is polyester.

4. A two-bar warp knit fabric comprising: front bar yarns and back bar yarns knit into a plurality of courses and wales and a fill yarn inserted in every other course, the design of the two bar fabric being represented by a front bar movement of 1-0/0-1/1-2/2-1 and a back bar movement of 1-1/1-1/0-0/0-0.

5. The fabric of claim 4 wherein the front bar yarns and the back bar yarns are polyester.

6. The fabric of claim 5 wherein the fill yarn is polyester.

* * * * *